United States Patent [19]
Babinec

[11] Patent Number: 5,471,337
[45] Date of Patent: Nov. 28, 1995

[54] PHOTOSTABLE SELF-ERASING ELECTROCHROMIC DEVICE

[75] Inventor: Susan J. Babinec, Midland, Mich.

[73] Assignee: The Dow Chemical Company, Midland, Mich.

[21] Appl. No.: 296,300

[22] Filed: Aug. 25, 1994

[51] Int. Cl.⁶ ...................................................... G02F 1/153
[52] U.S. Cl. ......................... 359/269; 359/267; 359/271; 502/154
[58] Field of Search ..................................... 359/265, 267, 359/268, 271, 271, 273, 269; 252/500, 600; 502/154, 162; 549/157.15, 157.6

[56] References Cited

U.S. PATENT DOCUMENTS

| | | | |
|---|---|---|---|
| 3,283,656 | 11/1966 | Jones et al. | 88/107 |
| 3,451,741 | 6/1969 | Manos | 350/160 |
| 4,090,782 | 3/1978 | Bredfeldt et al. | 359/268 |
| 4,093,358 | 6/1978 | Shattuck et al. | 359/268 |
| 4,139,276 | 2/1979 | Clecak et al. | 359/265 |
| 4,443,057 | 4/1984 | Bauer et al. | 359/606 |
| 4,612,301 | 9/1986 | Currie et al. | 502/154 |
| 4,839,008 | 6/1989 | Hill | 204/157.15 |
| 4,864,041 | 9/1989 | Hill | 549/513 |
| 4,917,477 | 4/1990 | Bechtel et al. | 359/267 |
| 5,128,799 | 7/1992 | Byker | 359/265 |
| 5,142,407 | 8/1992 | Varaprasad et al. | 359/276 |

OTHER PUBLICATIONS

Byker, H. J., "Commercial Developments in Electrochromics", Abstract No. 387, (1993) *Electrochromics Symposium.*

Hill, C. L., "Catalytic Photochemical Dehydrogenation of Organic Substrates by Polyoxometalates", J. Am. Chem. Soc., (1985) 107, 5148–5157.

*Primary Examiner*—Loha Ben
*Attorney, Agent, or Firm*—Timothy S. Stevens

[57] ABSTRACT

An electrochromic device comprising three elements. The first element is a first electrode. The second element is a second electrode. The second electrode is spaced apart from the first electrode so that there is a space between the first electrode and the second electrode. The third element is a dispersion positioned in the space. The dispersion is in electrical contact with the first electrode and with the second electrode. The dispersion comprises a polyoxometalate such as $H_3PW_{12}O_{40}$, a counter electrode couple such as ferrocene and a solvent selected from the group consisting of propylene carbonate, ethylene carbonate, nitriles, cyanoethyl ether, water, dimethylsulfoxide, nitromethane, nitrobenzene, acetic acid, dimethoxy benzene, toluene, tetramethylene sulfone, 3-methyl sulfolane, 2-methyl glutaronitrile, cyanoethyl ether, gamma butyrolactone, gamma valerolactone and acetone. The dispersion is resistant to photodegradation such as discoloring in sunlight.

10 Claims, 1 Drawing Sheet

PHOTOSTABLE SELF-ERASING ELECTROCHROMIC DEVICE

BACKGROUND

Single compartment self-erasing electrochromic devices were apparently first disclosed by Manos in U.S. Pat. No. 3,451,741. However, such devices were not commercially developed until the Byker device of U.S. Pat. No. 5,128,799 was commercialized by Gentex Corporation. Gentex Corporation has reportedly sold over two million of these devices in the form of interior rear view mirrors for automobiles. However, the electrochromically active compounds used in the Gentex device have limited photochemical stability. It would be an advance in this art if single compartment self-erasing liquid filled electrochromic devices could be developed that had better photochemical stability.

Polyoxometalates are known to be electrochromically active. Polyoxometalates are also known to be photochemically active. For example, Currie et al., U.S. Pat. No. 4,612,301 discloses polyoxometalates as photocatalysts for alcohol conversion. Polyoxometalates can even be used for the photooxidation of alkanes, see U.S. Pat. No. 4,839,008 to Hill.

SUMMARY OF THE INVENTION

The primary benefit of this invention is a solution to the above discussed photochemical stability problem. In this invention a polyoxometalate, a selected solvent and a counter electrode couple are used in a dispersion filling the compartment of a single compartment self-erasing electrochromic device. The polyoxometalate is photochemically stable in this system.

More specifically, this invention is an electrochromic device comprising three elements. The first element is a first electrode. The second element is a second electrode. The second electrode is spaced apart from the first electrode so that there is a space between the first electrode and the second electrode. The third element is a dispersion positioned in the space. The dispersion is in electrical contact with the first electrode and the second electrode. The dispersion comprises a polyoxometalate, a counter electrode couple and a solvent selected from the group consisting of propylene carbonate, ethylene carbonate, gamma valerolactone, acetone, methylene chloride, ethylene dichloride, alkanes and water. If the polyoxometalate is a tungsten polyoxometalate, then the solvent can be selected from the group consisting of propylene carbonate, ethylene carbonate, nitriles, cyanoethyl ether, water, dimethylsulfoxide, nitromethane, nitrobenzene, acetic acid, dimethoxy benzene, toluene, tetramethylene sulfone, 3-methyl sulfolane, 2-methyl glutaronitrile, cyanoethyl ether, gamma butyrolactone, gamma valerolactone, chlorinated hydrocarbons and acetone.

DETAILED DESCRIPTION OF THE INVENTION

Figure 1:
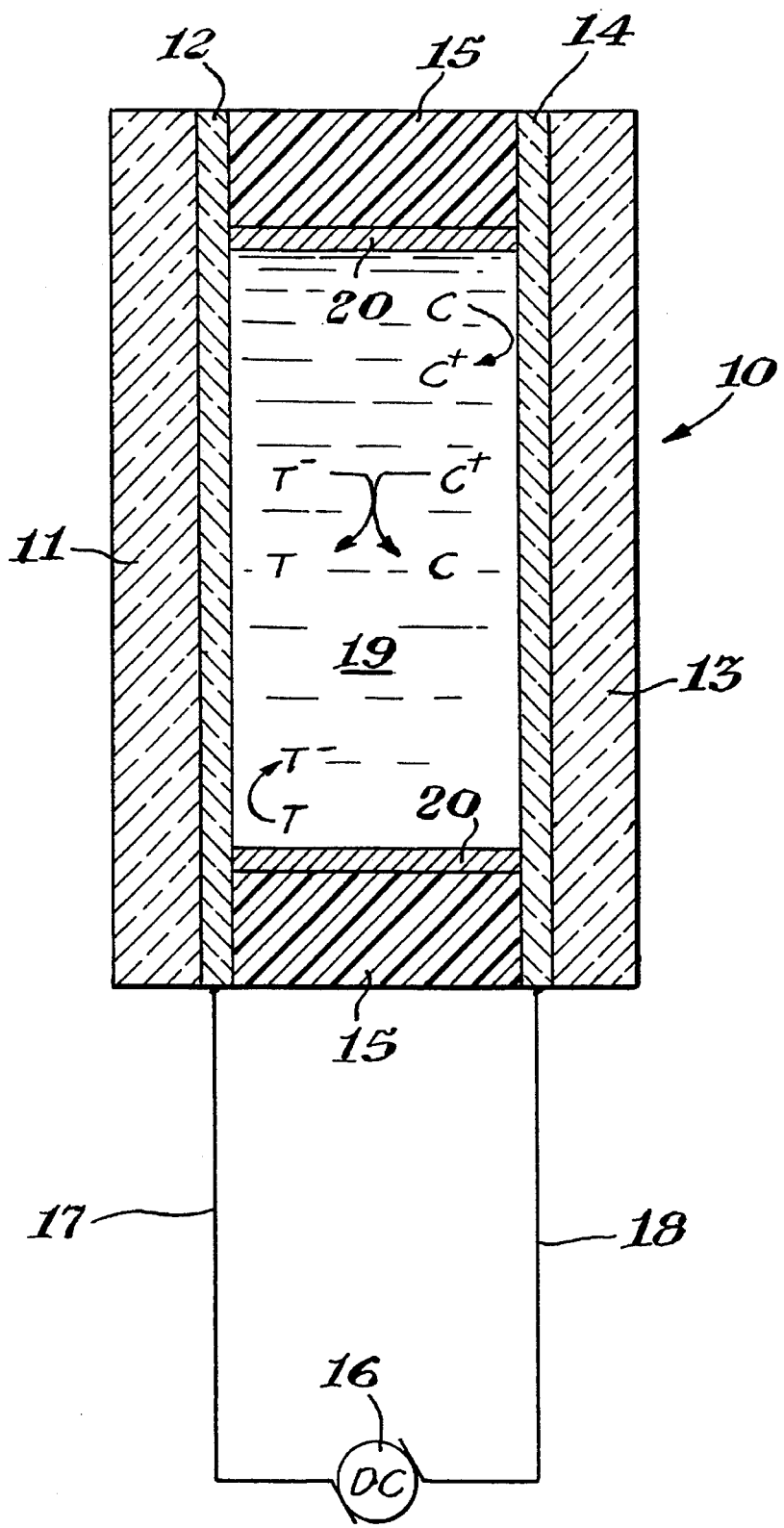
FIG. 1 is a cross-sectional view of a single compartment self-erasing electrochromic device filled with a dispersion incorporating a polyoxometalate, a counter electrode couple and a selected solvent.

Referring now to FIG. 1, therein is shown a cross-sectional view of a single compartment self-erasing electrochromic device 10. The device 10 includes a first pane of glass 11. The first pane of glass 11 is coated with a first layer of indium-tin oxide 12. Similarly, the device 10 includes a second pane of glass 13. The second pane of glass 13 is coated with a second layer of indium-tin oxide 14. The first and second panes of glass are spaced apart by a spacer or gasket 20. The marginal edges of the first and second panes of glass 11 and 13 are sealed with an epoxy sealant 15.

One terminal of a direct current electrical power supply 16 is connected to the first layer of indium-tin oxide 12 by a first wire 17. The other terminal of the direct current electrical power supply 16 is connected to the second layer of indium-tin oxide 14 by a second wire 18. The first layer of indium-tin oxide 12 is the first electrode of the device 10. Similarly, the second layer of indium-tin oxide 14 is the second electrode of the device 10.

The device 10 includes a space 19 between the first and second layers of indium-tin oxide 12 and 14. The space 19 is filled with a dispersion comprising a polyoxometalate, a counter electrode couple and a selected solvent, the dispersion being in electrical contact with the first and second layers of indium-tin oxide 12 and 14.

The term "polyoxometalate" means an isopoly anion, or a heteropoly anion. Isopoly anions and heteropoly anions are well known, see for example Professor Pope's book entitled "Heteropoly and Isopoly Oxometalates" copyright date 1983. The cation of the polyoxometalate is not critical in the instant invention. However, the cation of the polyoxometalate can have an effect on the solubility of the polyoxometalate, e.g., a quaternary ammonium cation can be used to increase the solubility of a polyoxometalate in a low polarity solvent.

An isopoly anion is a metal oxide compound comprising oxygen and a metal selected from the group consisting of molybdenum VI, tungsten VI, vanadium V, niobium V and tantalum V. An example of an isopoly anion is $H_2W_{12}O_{40}^{-6}$. A heteropoly anion is a metal oxide compound comprising oxygen, an element such as phosphorus, arsenic, silicon, germanium, boron, aluminum or many first row transition metals, such as iron or cobalt and a metal selected from the group consisting of molybdenum VI, tungsten VI, vanadium V, niobium V and tantalum V. The heteroatoms are located at well defined sites within the polyoxometalate molecule at either the core or at the surface. Examples of heteropoly anions having the heteroatoms at the core are $PW_{12}O_{40}^{-3}$ and $FeW_{12}O_{40}^{-5}$. A tungsten polyoxometalate is a polyoxometalate in which the metal portion of the polyoxometalate is more than fifty percent tungsten on a mole percent basis. Similarly, a molybdenum polyoxometalate is a polyoxometalate in which the metal is more than fifty percent molybdenum on a mole percent basis.

The term "dispersion" means a true solution on the molecular or ionic level or a colloidal dispersion or even a dispersion of particles larger than the colloidal dimension and includes dispersions in gelled solvent and dispersions in polymers plasticized by the solvent. The solvent can be selected from the group consisting of propylene carbonate, ethylene carbonate, gamma valerolactone, acetone, methylene chloride, ethylene dichloride, alkanes and water. If the polyoxometalate is a tungsten polyoxometalate, then the solvent can be selected from the group consisting of propylene carbonate, ethylene carbonate, nitriles, cyanoethyl ether, water, dimethylsulfoxide, nitromethane, nitrobenzene, acetic acid, dimethoxy benzene, toluene, tetramethylene sulfone, 3-methyl sulfolane, 2-methyl glutaronitrile, cyanoethyl ether, gamma butyrolactone, gamma valerolactone, chlorinated hydrocarbons and acetone.

The term "counter electrode couple" means a species which is reduced when the polyoxometalate is oxidized and which is oxidized when the polyoxometalate is reduced. Ferrocene is a highly preferred counter electrode couple. Cobaltocene, ruthenocene and vanadocene are also useful as counter electrode couples. Iron-ethylenediamenetetraacetic acid (Iron-EDTA), e.g., LiFeEDTA, is also a highly preferred counter electrode couple. Ruthenium-EDTA, cobalt-EDTA, and Manganese-EDTA are also useful as counter electrode couples. Ferroin is a useful counter electrode couple. Ferrocene carboxylate, acid or salt, butyl ferrocene and decamethyl ferrocene can be used. The solubility of the counter electrode couple in the dispersion of the instant invention will be an important factor in selecting a counter electrode couple.

The use of indium-tin oxide as the electrode material is not critical in this invention. However, indium-tin oxide is a highly preferred electrode material since it can be transparent, corrosion resistant and electronically conductive. However, almost any electronically conducting material can be used as an electrode in this invention. Examples of various electrode materials that can be used include various metals and preferably the more noble metals such as gold, silver, rhodium, palladium, or platinum. When the electrochromic device desired is an electrochromic window, then both electrodes are usually transparent, e.g., a thin layer of gold. When the electrochromic device desired is an electrochromic display or mirror, then only one electrode is usually transparent.

Referring again to FIG. 1, a polyoxometalate, T, is shown as being reduced at the first layer of indium-tin oxide 12 to form $T^-$. FIG. 1 also shows the counter electrode couple, C, being oxidized at the second layer of indium-tin oxide 14 to form $C^+$. The term "electrical contact" means that the polyoxometalate and counter electrode couple of the dispersion are sufficiently exposed to the electrodes so that the above referred to oxidation and reduction reactions can occur if a sufficient voltage is applied between the electrodes. In this regard, it is often desirable to incorporate a supporting electrolyte into the dispersion of the instant invention to reduce the electrical resistance (IR drop) of the solution between the electrodes. The total voltage required to drive the color forming reaction includes: (a) the thermodynamic voltage difference between the $T^-$ and $C^+$ states; (b) the IR drop of the solution; (c) the kinetic overvoltage which drives the reaction at a rate faster than equilibrium; and (d) the concentration gradient overvoltage.

Referring still to FIG. 1, the reduced polyoxometalate, $T^-$, and the oxidized counter electrode couple, $C^+$, diffuse towards the center of the space 19 and react to form T and C. Thus, when the direct current electrical power supply 16 is turned off, then the device 10 generally begins to transmit more light, i.e., to self erase.

The spacing between the first and second electrodes is not critical in the instant invention. However it should be understood that if the spacing is made greater, all other factors the same, then the device can be made to transmit less light and it will also take longer to self erase. The spacing between the first and second electrodes can be as little as ten micrometers or even less. On the other hand, the spacing between the first and second electrodes can be as much as one or two millimeters or more. In the test device discussed below in Example 2, the spacing is about one hundred and forty micrometers.

The voltage applied between the first and second electrodes is also not critical in the operation of the device of this invention. However, for the device of this invention to darken the voltage applied between the first and second electrodes must be sufficient to reduce the polyoxometalate and oxidize the counter electrode couple. It should also be understood and will be understood by persons of ordinary skill in the art of electrochromic devices that if the voltage applied between the first and second electrodes is excessive, then undesirable reactions can occur at the first or second electrode which will reduce the lifetime of the device just as much as undesirable photoinduced reactions if the dispersion were not photostable in sunlight.

The polarity of the voltage applied between the first and second electrodes is not critical in the operation of the device of this invention. Although the device of this invention is self-erasing, reversing the polarity of the applied voltage for a relatively short time can reduce the time needed to erase the device. However, if an excessive reverse polarity of the applied voltage is used, then the device will, of course, not erase but will instead become dark again or effectively remain dark. Applying zero volts to the electrodes or shorting the electrodes is an effective means for improving the self-erasing time.

The dispersion of the instant invention can also be thickened with a thickening agent. The term "thickening agent" means a material which when added to the dispersion increases the viscosity of the dispersion. Generally, the use of a thickening agent in the dispersion decreases the rate of diffusion of the oxidized polyoxometalate and the reduced counter electrode couple in the space which in turn can allow the use of a thinner space between the first and second electrodes. A highly preferred thickening agent in the instant invention is poly(methylmethacrylate). Perfluorosulfonic acid polymers can also be used as a thickening agent.

The concentration of the polyoxometalate and the counter electrode couple is not critical in this invention. However it is generally preferable to use a dispersion which is nearly but not completely saturated with the polyoxometalate and the counter electrode couple.

EXAMPLE 1

This example will demonstrate the preparation of a dispersion according to a preferred embodiment of this invention. The following solution is prepared in propylene carbonate: three weight percent $H_3PW_{12}O_{40}$ (Aldrich Chemical Company, Milwaukee, Wis.), ten weight percent poly(methylmethacrylate) as a thickener (Aldrich), sixty four hundredths of one weight percent ferrocene as the counter electrode couple (Aldrich), the dispersion being one tenth molar in lithium perchlorate as a supporting electrolyte. The resulting dispersion is filtered to remove any particulates and sparged with nitrogen gas for fifteen minutes prior to use.

EXAMPLE 2

This example will demonstrate a manufacture of spaced electrodes according to a preferred embodiment of this invention. Two one hundred millimeter by one hundred millimeter panels of indium-tin oxide coated glass, indium-tin oxide sides facing one another (available as PD5002 from the Donnelly Corporation of Holland Mich.) are spaced apart about one hundred and forty micrometers by one hundred and forty micrometer thick polyethylene gasket strips positioned near the edges of the glass panels. Epoxy resin is applied sparingly to the edges of the glass panels to seal them together. However two gaps are left in the epoxy seal and polyethylene gasket on opposite edges of the glass panels so that the space between the glass panels can be filled with the dispersion of Example 1 above. In addition, the glass panels are slightly translated with respect to each other to allow electrical contact with the indium-tin oxide layers.

EXAMPLE 3

This example will demonstrate the preparation of an electrochromic device according to a preferred embodiment of this invention. The apparatus of Example 2 is filled with the dispersion of Example 1 by way of the two gaps left in the apparatus as discussed in Example 2. The two gaps are then sealed with more epoxy resin.

EXAMPLE 4

This example will demonstrate the operation of the device of Example 3. One half volt is applied across the indium-tin oxide layers for thirty seconds and the device darkens seven hundredths of an absorbance unit at a wavelength of six hundred and thirty two nanometers, the test wavelength used to determine absorbance for each Example hereafter. Six tenths volt is applied across the indium-tin oxide layers for thirty seconds and the device darkens twenty four hundredths of an absorbance unit. Thirty seconds later at zero applied volts, the device has self erased sixteen hundredths of an absorbance unit. Seven tenths volt is applied across the indium-tin oxide layers for thirty seconds and the device darkens thirty hundredths of an absorbance unit. Thirty seconds later at zero applied volts, the device has self erased thirty hundredths of an absorbance unit.

Five tenths volt is applied across the indium-tin oxide layers for two minutes and the device darkens twenty hundredths of an absorbance unit. Thirty seconds later at zero applied volts, the device has self erased twenty hundredths of an absorbance unit. Six tenths volt is applied across the indium-tin oxide layers for two minutes and the device darkens forty one hundredths of an absorbance unit. Thirty seconds later at zero applied volts, the device has self erased forty one hundredths of an absorbance unit. Seven tenths volt is applied across the indium-tin oxide layers for two minutes and the device darkens seventy hundredths of an absorbance unit. Thirty seconds later at zero applied volts, the device has self erased sixty five hundredths of an absorbance unit.

EXAMPLE 5

The dispersion of Example 1 is placed three inches from a Dymax Light Welder PC-2 ultraviolet light source for ten minutes and it does not change color. The dispersion of Example 1 is placed in direct sunlight for two days and it does not change color.

EXAMPLE 6

A device like the device of Example 3 is prepared except that the gap between the panels of indium-tin oxide coated glass is reduced from one hundred and forty micrometers to seventy micrometers. Five tenths volt is applied across the indium-tin oxide layers for thirty seconds and the device darkens nine hundredths of an absorbance unit. Thirty seconds later at zero applied volts, the device has self erased nine hundredths of an absorbance unit. Six tenths volt is applied across the indium-tin oxide layers for thirty seconds and the device darkens twenty one hundredths of an absorbance unit. Thirty seconds later at zero applied volts, the device has self erased twenty hundredths of an absorbance unit. Seven tenths volt is applied across the indium-tin oxide layers for thirty seconds and the device darkens twenty nine hundredths of an absorbance unit. Thirty seconds later at zero applied volts, the device has self erased twenty eight hundredths of an absorbance unit.

Five tenths volt is applied across the indium-tin oxide layers for two minutes and the device darkens thirteen hundredths of an absorbance unit. Thirty seconds later at zero applied volts, the device has self erased thirteen hundredths of an absorbance unit. Six tenths volt is applied across the indium-tin oxide layers for two minutes and the device darkens twenty three hundredths of an absorbance unit. Thirty seconds later at zero applied volts, the device has self erased twenty three hundredths of an absorbance unit. Seven tenths volt is applied across the indium-tin oxide layers for two minutes and the device darkens forty hundredths of an absorbance unit. Thirty seconds later at zero applied volts, the device has self erased forty hundredths of an absorbance unit.

EXAMPLE 7

This example will demonstrate the preparation of a dispersion like the dispersion of Example 1 except that a different counter electrode couple is used. The following solution is prepared in propylene carbonate: three weight percent $H_3PW_{12}O_{40}$ (Aldrich Chemical Company, Milwaukee, Wis.), ten weight percent poly(methylmethacrylate) as a thickener (Aldrich), one weight percent $(C_4H_9)_4NBr_{14}W_6$ as the counter electrode couple, the dispersion being one tenth molar in lithium perchlorate as a supporting electrolyte. The resulting dispersion is filtered to remove any particulates and sparged with nitrogen gas for fifteen minutes prior to use.

EXAMPLE 8

An apparatus like the apparatus of Example 2 is prepared except that the gap between the panels of indium-tin oxide coated glass is reduced from one hundred and forty micrometers to seventy micrometers. The apparatus is filled with the dispersion of Example 8 by way of the two gaps left in the apparatus as discussed in Example 2. The two gaps are then sealed with more epoxy resin. It will be seen in this Example that, although within the broad scope of the invention, $(C_4H_9)_4NBr_{14}W_6$ is not a highly preferred counter electrode couple.

One and three tenths volt is applied across the indium-tin oxide layers for thirty seconds and the device darkens eight hundredths of an absorbance unit. Thirty seconds later at zero applied volts, the device has self erased six hundredths of an absorbance unit. One and four tenths volt is applied across the indium-tin oxide layers for thirty seconds and the device darkens eight hundredths of an absorbance unit. Thirty seconds later at zero applied volts, the device has self erased six hundredths of an absorbance unit. One and five tenths volt is applied across the indium-tin oxide layers for thirty seconds and the device darkens eight hundredths of an absorbance unit. Thirty seconds later at zero applied volts, the device has self erased six hundredths of an absorbance unit. One and six tenths volt is applied across the indium-tin oxide layers for thirty seconds and the device darkens eleven hundredths of an absorbance unit. One and seven tenths volt is applied across the indium-tin oxide layers for thirty seconds and the device darkens twenty three hundredths of an absorbance unit. Thirty seconds later at zero applied volts, the device has self erased eight hundredths of an absorbance unit. Five minutes later at zero applied volts, the device has self erased ten hundredths of an absorbance unit. Fifteen minutes later at zero applied volts, the device has self erased eleven hundredths of an absorbance unit.

What is claimed is:

1. An electrochromic device comprising:
   (a) a first electrode;
   (b) a second electrode, the second electrode spaced apart from the first electrode so that there is a space between the first electrode and the second electrode; and
   (c) a dispersion positioned in the space between the first electrode and the second electrode, the dispersion being in electrical contact with the first electrode and with the second electrode, the dispersion comprising a polyoxometalate, a counter electrode couple and a solvent, the solvent selected from the group consisting of propylene carbonate, ethylene carbonate, gamma valerolactone, acetone, methylene chloride, ethylene dichloride, alkanes and water.

2. The device of claim 1, wherein the counter electrode couple is selected from the group consisting of ferrocene, cobaltocene, ruthenocene, vanadocene, ferricyanide salts, thioferricyanide salts, iron-EDTA, ruthenium-EDTA, cobalt-EDTA, manganese-EDTA, and ferroin.

3. The device of claim 1, wherein the dispersion further comprises a thickening agent.

4. The electrochromic device of claim 3, wherein the liquid solvent comprises propylene carbonate, the counter electrode couple is a ferrocene, the thickening agent is poly(methylmethacrylate), the first electrode is indium tin oxide coated glass, the second electrode is indium tin oxide coated glass, and the polyoxometalate is $H_3PW_{12}O_{40}$.

5. The electrochromic device of claim 1, wherein the polyoxometalate is a molybdenum polyoxometalate.

6. The electrochromic device of claim 1, wherein the polyoxometalate is a tungsten polyoxometalate.

7. An electrochromic device comprising:
    (a) a first electrode;
    (b) a second electrode, the second electrode spaced apart from the first electrode so that there is a space between the first electrode and the second electrode; and
    (c) a dispersion positioned in the space between the first electrode and the second electrode, the dispersion being in electrical contact with the first electrode and with the second electrode, the dispersion comprising a tungsten polyoxometalate, a counter electrode couple and a solvent, the solvent selected from the group consisting of propylene carbonate, ethylene carbonate, nitriles, cyanoethyl ether, water, dimethylsulfoxide, nitromethane, nitrobenzene, acetic acid, dimethoxy benzene, toluene, tetramethylene sulfone, 3-methyl sulfolane, 2-methyl glutaronitrile, cyanoethyl ether, gamma butyrolactone, gamma valerolactone, chlorinated hydrocarbons and acetone.

8. The device of claim 7, wherein the counter electrode couple is selected from the group consisting of ferrocene, cobaltocene, ruthenocene, vanadocene, ferrocene carboxylate, butyl ferrocene, decamethyl ferrocene, ferricyanide salts, thioferricyanide salts, iron-EDTA, ruthenium-EDTA, cobalt-EDTA, manganese-EDTA, and ferroin.

9. The device of claim 7, wherein the dispersion further comprising a thickening agent.

10. The electrochromic device of claim 9 wherein the liquid solvent comprises propylene carbonate, the counter electrode couple is a ferrocene, the thickening agent is poly(methylmethacrylate), the first electrode is indium tin oxide coated glass, the second electrode is indium tin oxide coated glass, and the tungsten polyoxometalate is $H_3PW_{12}O_{40}$.

* * * * *